United States Patent
Kim

(10) Patent No.: US 7,529,817 B2
(45) Date of Patent: May 5, 2009

(54) METHOD FOR MANAGING DUPLICATED ARRIVAL NOTIFICATION MESSAGE IN MULTIMEDIA MESSAGING SERVICE

(75) Inventor: Han-Soo Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 791 days.

(21) Appl. No.: 11/216,850

(22) Filed: Aug. 31, 2005

(65) Prior Publication Data

US 2006/0166651 A1 Jul. 27, 2006

(30) Foreign Application Priority Data

Nov. 8, 2004 (KR) ...................... 10-2004-0090575

(51) Int. Cl.
*G06F 15/177* (2006.01)
(52) U.S. Cl. ...................... 709/220; 709/203; 709/206; 709/207; 709/223; 709/248
(58) Field of Classification Search ................ 709/203, 709/206, 207, 223, 248, 220
See application file for complete search history.

(56) References Cited

U.S. PATENT DOCUMENTS 5,995,594 A * 11/1999 Shaffer et al. ............ 379/88.12
6,243,739 B1 * 6/2001 Schwartz et al. ............ 709/206
7,302,702 B2 * 11/2007 Hippelainen ................. 726/13
2007/0100951 A1 * 5/2007 Bae ............................. 709/206

OTHER PUBLICATIONS

Open Mobile Alliance, "Multimedia Messaging Service Encapsulation Protocol Version 1.3", Nov. 3, 2004.

* cited by examiner

*Primary Examiner*—Michael Won
(74) *Attorney, Agent, or Firm*—The Farrell Law Firm, PC

(57) ABSTRACT

Disclosed is a method for managing a duplicated MMS arrival notification message. The method includes the steps of receiving, by the MMS proxy server, a download completion notification message transmitted from the receiving mobile terminal and transmitting a duplicated-message deletion message to the receiving mobile terminal in response to the download completion notification message, receiving, by the receiving mobile terminal, the duplicated-message deletion message and deleting a relevant message from among received MMS arrival notifications, and displaying that the relevant message has been deleted in an MMS server and thus cannot be download for the user.

6 Claims, 4 Drawing Sheets

| Name | Content |
|---|---|
| X-Mms-Message-Type | Message-Type-value=m-notification.ind |
| X-Mms-Transaction-ID | Transaction-id-value |
| X-Mms-MMs-Version | MMS-version-value |
| From | From-value |
| Subject | Subject-value |
| X-Mms-Message-Class | Message-Class-value |
| X-Mms-Message-size | Message-size-value |
| X-Mms-Expiry | Expiry-value |
| X-Mms-Content-Location | Content-Location-value |
| X-Mms-Delete-Transaction-ID | Delete-Transaction-id-value |
| X-Mms-Delete-Reason | Delete-Reason-value |

FIG.4

METHOD FOR MANAGING DUPLICATED ARRIVAL NOTIFICATION MESSAGE IN MULTIMEDIA MESSAGING SERVICE

PRIORITY

This application claims priority to an application entitled "Method for Managing Duplicated Arrival Notification Message in Multimedia Messaging Service" filed in the Korean Intellectual Property Office on Nov. 8, 2004 and assigned Serial No. 2004-90575, the contents of which are incorporated herein by reference.

BACKGROUND OF THE INVENTION

1. Field of the Invention

The present invention relates to a method for managing a multimedia-messaging-service message arrival notification message (MMS arrival notification) in a multimedia messaging service (MMS), in which an MMS proxy server transmits a deletion message (duplicated-message deletion message) for deleting a duplicated arrival notification to a receiving mobile terminal so that the receiving mobile terminal may delete a relevant duplicated message, thereby preventing valuable bandwidth from being wasted in a wireless environment and preventing unnecessary charges from doubly imposed on the user.

2. Description of the Related Art

In general, when a receiving mobile terminal transmits a response message to an MMS proxy server in response to an MMS arrival notification, a CSD bearer or a GPRS bearer is used, in which the two bearers have different connection types which vary according to network environments. Therefore, a poor network environment can result in the loss of a response message which was transmitted from the receiving mobile terminal (in response to an MMS arrival notification) to the MMS proxy server.

When the response message to the MMS arrival notification is not received by the MMS proxy server after a predetermined period of time elapses, the MMS proxy server determines that the MMS arrival notification was not received by the receiving mobile terminal and retransmits the MMS arrival notification. When the receiving mobile terminal normally receives the MMS arrival notification but the response message to the MMS arrival notification is not received by the MMS proxy server within a predetermined time period, the MMS proxy server retransmits the MMS arrival notification, so that the receiving mobile terminal receives the MMS arrival notifications for the same MMS message twice.

In this case, since the respective MMS arrival notifications have different transaction-IDs from each other (although the notifications relate to the same MMS message), the user thinking that the MMS arrival notifications relate to different MMS messages, therefore may request unnecessarily the download of the same MMS message several times.

Since the user attempts to download the same MMS message twice as described above, the user is inconvenienced and can also be charged twice for unnecessary wireless services. In addition, from the mobile communication provider's standpoint, such repeated transmission of the same MMS causes bandwidth to be unnecessarily wasted, so that limited resources are used inefficiently.

SUMMARY OF THE INVENTION

Accordingly, the present invention has been made to solve the above-mentioned problems occurring in the prior art, and an object of the present invention is to provide a method for managing a duplicated arrival notification message in a multimedia messaging service, in which an MMS proxy server transmits a duplicated-message deletion message for deleting a duplicated MMS arrival notification to a receiving mobile terminal, so that the receiving mobile terminal having received the duplicated-message deletion message can delete the duplicated MMS arrival notification, thereby preventing waste of bandwidth and a double-charge to the user.

To accomplish this object, in accordance with one aspect of the present invention, there is provided a method for managing a duplicated arrival notification message in a multimedia messaging service system which includes an MMS proxy server and a receiving mobile communication terminal, the method including the steps of receiving by the MMS proxy server a download completion notification message for an MMS message transmitted from the receiving mobile terminal, transmitting a duplicated-message deletion message from the MMS proxy server to the receiving mobile terminal when the MMS proxy server receives the download completion notification message, and extracting and deleting only a duplicated MMS arrival notification message from among previously-received MMS arrival notification messages with reference to the duplicated-message deletion message by the receiving mobile terminal when the receiving mobile terminal receives the duplicated-message deletion message from the MMS proxy server.

BRIEF DESCRIPTION OF THE DRAWINGS

The above and other objects, features and advantages of the present invention will be more apparent from the following detailed description taken in conjunction with the accompanying drawings, in which:

FIG. 4 is a view representing a format of a duplicated-message deletion message (M-DeleteNoti.ind) for a duplicated MMS arrival notification.

DETAILED DESCRIPTION OF THE PREFERRED EMBODIMENT

Hereinafter, preferred embodiments according to the present invention will be described with reference to the accompanying drawings. In the following description of the present invention, a detailed description of known functions and configurations incorporated herein will be omitted when it may obscure the subject matter of the present invention.

Figure 1:
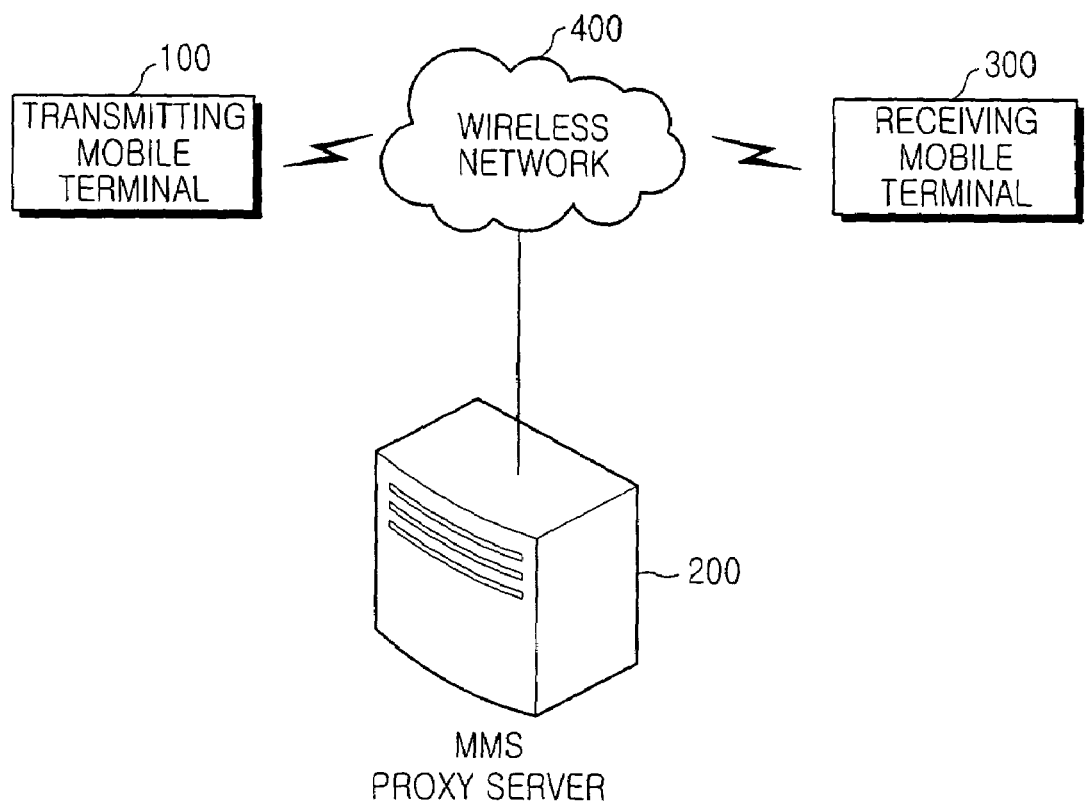
FIG. 1 is a block diagram illustrating a construction of a multimedia messaging service system in a mobile communication network to which the present invention can be applied.

A block diagram illustrating a construction of a multimedia messaging service system in a mobile communication network to which the present invention can be applied is shown in FIG. 1. The multimedia messaging service (MMS) system according to an embodiment of the present invention includes a wireless communication network 400, an MMS proxy server 200 cooperating with the wireless communication network 400, a transmitting mobile terminal 100 and a receiving mobile terminal 300.

The wireless communication network 400 allows transmission of multimedia messages such as voice, text, video, etc. When the transmitting mobile terminal 100 forms and transmits a multimedia message, the multimedia message is uploaded to the MMS proxy server 200 cooperating with the transmitting mobile terminal 100 through the wireless communication network 400, and the MMS proxy server 200 notifies the relevant receiving mobile terminal 300 of the arrival of the multimedia message by transmitting an MMS arrival notification message (MMS arrival notification). When the receiving mobile terminal 300 receives the MMS arrival notification, the receiving mobile terminal 300 recognizes the arrival of the multimedia message to be downloaded by the receiving mobile terminal 300 and downloads the relevant multimedia message from the MMS proxy server 200. In this case, whenever the MMS proxy server 200 transmits one MMS arrival notification to the receiving mobile terminal 300, the MMS proxy server 200 creates and transmits one specific transaction-ID for each message. Therefore, the doubly-transmitted MMS arrival notifications for the same MMS message have different X-Mms-Transaction-IDs from each other. However, although the MMS arrival notification messages have different X-Mms-Transaction-IDs, the MMS arrival notifications have equal URI (Uniform Resource Identifier) information because they were transmitted twice for the same MMS message.

TABLE 1

First MMS arrival notification (M-Notification.ind)

X-Mms-Transaction-ID : 0x7fa00fec
X-Mms-Content-Location : http://172.28.241.0/servlet/mms?message
-id=4375201

TABLE 2

Second MMS arrival notification (M-Notification.ind)

X-Mms-Transaction-ID : 0x7f980fec
X-Mms-Content-Location : http://172.28.241.0/servlet/mms?message
-id=4375201

Tables 1 and 2 show an example of an MMS arrival notification message transmitted twice for the same message as described above. As shown in Tables 1 and 2, it can be understood that the two MMS arrival notifications have the same contents although they have different X-Mms-Transaction-IDs from each other. When the user receives such repeatedly transmitted MMS arrival notification messages, not only can the user be subject to paying for transmission fees twice for the same MMS message having the same contents, but also bandwidth is unnecessarily wasted due to the duplicated message transmission. Additionally, the user is inconvenienced.

Therefore, according to the present invention, when such a duplicated message is transmitted, the MMS proxy server receives an MMS message download completion notification message transmitted from the receiving mobile terminal and transmits a duplicated-message deletion message to the receiving mobile terminal, thereby enabling the receiving mobile terminal to delete a duplicated MMS arrival notification corresponding to the duplicated-message deletion message from among previously-received MMS arrival notifications. Conventionally, the transmission/reception of an MMS message between the MMS proxy server 200 and the receiving mobile terminal 300 is performed by means of one of an immediate retrieval scheme and a delayed retrieval scheme.

Hereinafter, the case of using the immediate retrieval scheme will be described as a first embodiment of the present invention and the case of using the delayed retrieval scheme will be described as a second embodiment.

Figure 2:
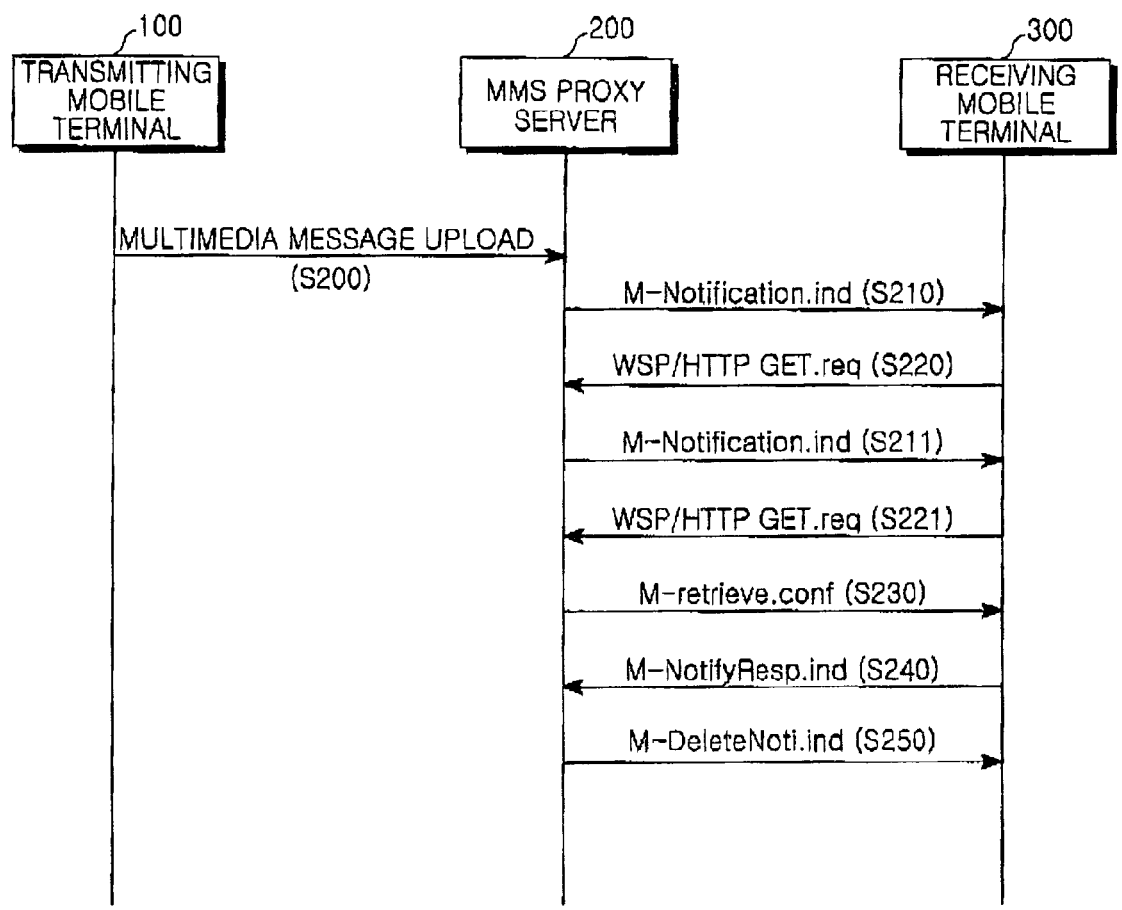
FIG. 2 is a flow diagram illustrating a method for providing a multimedia message service in the immediate retrieval scheme in the mobile communication network according to the first embodiment of the present invention.

A flow diagram illustrating a method for providing a multimedia message service in the mobile communication network according to the first embodiment of the present invention is shown in FIG. 2. More particularly FIG. 2 also illustrates a method for providing a multimedia message service in the immediate retrieval scheme. First, with reference to FIG. 1, the transmitting mobile terminal 100 forms a multimedia message which is to be transmitted and uploads the multimedia message to the MMS proxy server 200 in step 200. When the multimedia message arrives at the MMS proxy server 200, the MMS proxy server 200 transmits an MMS arrival notification (e.g., X-Mms-Transaction-ID: 0x7fa00fec) to the receiving mobile terminal 300 in step 210. When the receiving mobile terminal 300 receives the MMS arrival notification (X-Mms-Transaction-ID:0x7fa00fec), the receiving mobile terminal 300 sends a WSP/HTTP GET request to retrieve a relevant message in step 220. When the WSP/HTTP GET request sent from the receiving mobile terminal 300 is not transmitted to (or received by) the MMS proxy server 200 due to a problem in the network, the MMS proxy server 200 determines that the relevant notification did not arrive at the receiving mobile terminal 300 and regenerates and retransmits an MMS arrival notification (X-Mms-Transaction-ID:0x7f980fec) to the receiving mobile terminal 300 in step 211.

In this case, as described above, the MMS arrival notification (X-Mms-Transaction-ID:0x7f980fec) newly-generated for retransmission has a different transaction-ID from that of the first MMS arrival notification message (X-Mms-Transaction-ID:0x7fa00fec) but has an URI of "X-Mms-Content-Location: http://172.28.241.0/servlet/mms?message-id=4375201" equal to that of the newly-generated MMS arrival notification message. Therefore, two MMS arrival notification message having different transaction-IDs for the same multimedia message simultaneously exist in the receiving mobile terminal 300, so that the user may think that two different multimedia messages were received. In this case, when the receiving mobile terminal 300 receives the second MMS arrival notification message (X-Mms-Transaction-ID: 0x7f980fec), the receiving terminal 300 sends a WSP/HTTP GET request to the MMS proxy server 200 in response to the second MMS arrival notification instep 221. When the WSP/HTTP GET request sent from the receiving mobile terminal 300 normally arrives at the MMS proxy server 200, the receiving mobile terminal 300 downloads (M-retrieve.conf) which is a relevant multimedia message from the MMS proxy server 200 in step 230. When the receiving mobile terminal 300 completes a download procedure for the relevant multimedia message, the receiving mobile terminal 300 transmits a download completion notification message (M-NotifyResp.ind) to the MMS proxy server 200 in order to inform that the download of the relevant multimedia message is completed in step 240.

When the MMS proxy server 200 receives the download completion notification message (M-NotifyResp.ind), the MMS proxy server 200 deletes the relevant multimedia message. Then, the MMS proxy server 200 transmits a duplicated-message deletion message (M-DeleteNoti.ind) to the receiving mobile terminal 300 for the purpose of informing the receiving mobile terminal of the deletion of the relevant multimedia message and/or of getting the receiving mobile terminal 300 to delete the duplicated MMS arrival notification in step 250. When receiving the duplicated-message deletion message (M-DeleteNoti.ind), the receiving mobile terminal 300 recognizes from the duplicated-message deletion message (M-DeleteNoti.ind) the fact that it is impossible to access relevant multimedia message any further. Then the receiving mobile terminal 300 extracts and deletes only a duplicated MMS arrival notification from among previously-received MMS arrival notification message on the basis of information included in the duplicated-message deletion message (M-Delete.Noti.ind).

Figure 3:
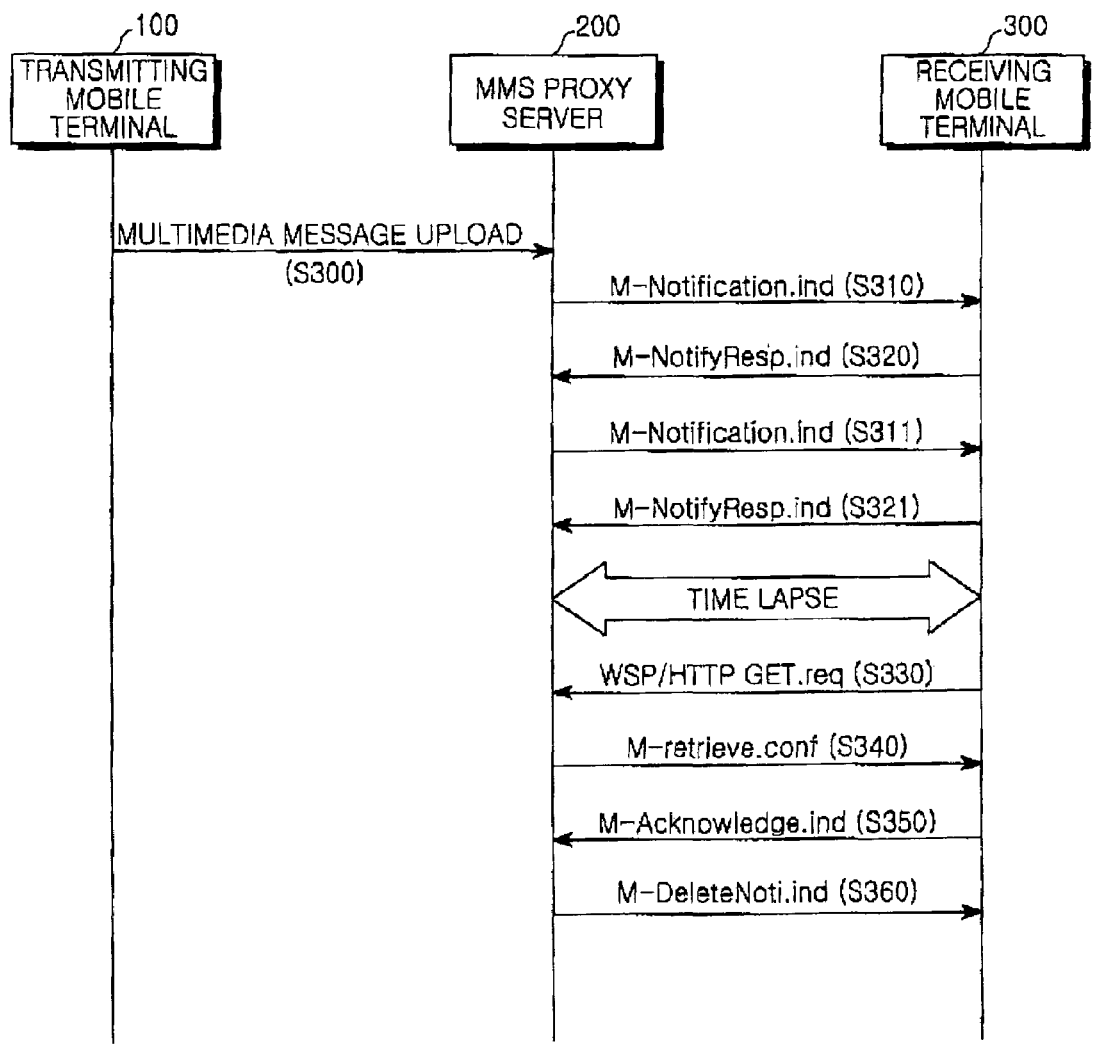
FIG. 3 is a flow diagram illustrating a method for providing a multimedia message service in the delayed retrieval scheme in the mobile communication network according to the second embodiment of the present invention.

A flow diagram illustrating a method for providing a multimedia message service in the mobile communication network according to the second embodiment of the present invention is shown in FIG. 3. More particularly FIG. 3 also illustrates a method for providing a multimedia message service in the delayed retrieval scheme. First, the transmitting mobile terminal 100 forms a multimedia message which is to be transmitted and uploads the multimedia message to the MMS proxy server 200 in step 300. When the multimedia message arrives at the MMS proxy server 200, the MMS proxy server 200 transmits an MMS arrival notification message (X-Mms-Transaction-ID:0x7fa00fec) to the receiving mobile terminal 300 in step 310.

When the receiving mobile terminal 300 receives the MMS arrival notification message (X-Mms-Transaction-ID:0x7fa00fec), the receiving mobile terminal 300 transmits a response message (M-NotifyResp.ind) to the MMS arrival notification in step 320. When the response message (M-NotifyResp.ind) transmitted from the receiving mobile terminal 300 is not received by the MMS proxy server 200 due to a problem in the network, the MMS proxy server 200 determines that the relevant MMS arrival notification messages was not to received by mobile terminal 300 and regenerates and retransmits an MMS arrival notification message (X-Mms-Transaction-ID:0x7f980fec) to the receiving mobile terminal 300 in step 311.

Through such a procedure, when the receiving mobile terminal 300 receives the MMS arrival notification message (X-Mms-Transaction-ID:0x7f980fec), the receiving mobile terminal 300 transmits a response message (M-NotifyResp.ind) to the MMS arrival notification message to the MMS proxy server 200 in step 321. When the MMS proxy server 200 receives the response message (M-NotifyResp.ind) to the MMS arrival notification message, the MMS proxy server 200 considers the MMS arrival notification message to be normally received by the mobile terminal 300. In this case, as described above, the MMS arrival notification message (X-Mms-Transaction-ID:0x7f980fec) newly-generated for retransmission has a different transaction-ID from that of the first MMS arrival notification (X-Mms-Transaction-ID: 0x7fa00fec) but has an URI of "X-Mms-Content-Location: http://172.28.241.0/servlet/mms?message-id=4375201" equal to that of the newly-generated MMS arrival notification.

Therefore, two MMS arrival notification message having different transaction-IDs for the same multimedia message simultaneously exist in the receiving mobile terminal 300, so that the may think that two different multimedia messages to arrive when in actuality only one multimedia message has arrived. In this case, in order for a user to check a multimedia message after a predetermined period of time, the receiving (X-Mms-Transaction-ID:0x7f980fec), the receiving mobile terminal 300 sends a WSP/HTTP GET request to the MMS proxy server 200 in response to the second MMS arrival notification in step 221. When the WSP/HTTP GET request sent from the receiving mobile terminal 300 normally arrives at the MMS proxy server 200, the receiving mobile terminal 300 downloads (M-retrieve.conf) which is a relevant multimedia message from the MMS proxy server 200 in step 230. When the receiving mobile terminal 300 completes a download procedure for the relevant multimedia message, the receiving mobile terminal 300 transmits a download completion notification message (M-NotifyResp.ind) to the MMS proxy server 200 in order to inform that the download of the relevant multimedia message is completed in step 240.

When the MMS proxy server 200 receives the download completion notification message (M-NotifyResp.ind), the MMS proxy server 200 deletes the relevant multimedia message. Then, the MMS proxy server 200 transmits a duplicated-message deletion message (M-DeleteNoti.ind) to the receiving mobile terminal 300 for the purpose of informing the receiving mobile terminal of the deletion of the relevant multimedia message and/or of getting the receiving mobile terminal 300 to delete the duplicated MMS arrival notification in step 250. When receiving the duplicated-message deletion message (M-DeleteNoti.ind), the receiving mobile terminal 300 recognizes from the duplicated-message deletion message (M-DeleteNoti.ind) the fact that it is impossible to access relevant multimedia message any further. Then the receiving mobile terminal 300 extracts and deletes only a duplicated MMS arrival notification from among previously-received MMS arrival notification message on the basis of information included in the duplicated-message deletion message (M-DeleteNoti.ind).

A flow diagram illustrating a method for providing a multimedia message service in the mobile communication network according to the second embodiment of the present invention is shown in FIG. 3. More particularly FIG. 3 also illustrates a method for providing a multimedia message service in the delayed retrieval scheme. First, the transmitting mobile terminal 100 forms a multimedia message which is to be transmitted and uploads the multimedia message to the MMS proxy server 200 in step mobile terminal 300 transmits a WSP/HTTP GET request for the download of a multimedia message to the MMS proxy server 200 in step 330. When the WSP/HTTP GET request transmitted from the receiving mobile terminal 300 arrives at the MMS proxy server 200, the receiving mobile terminal 300 downloads (M-retrieve.conf) a relevant multimedia message from the MMS proxy server 200 in step 340. When the receiving mobile terminal 300 completes a download procedure for the relevant multimedia message, the receiving mobile terminal 300 transmits a download completion notification message (M-Acknowledge.ind) to the MMS proxy server 200 in order to inform that the download of the relevant multimedia message is completed in step 350.

When the MMS proxy server 200 receives the download completion notification message (M-Acknowledge.ind), the MMS proxy server 200 deletes the relevant multimedia message. Then, the MMS proxy server 200 transmits a duplicated-message deletion message (M-DeleteNoti.ind) to the receiving mobile terminal 300 for the purpose of informing the deletion of the relevant multimedia message and of getting the receiving mobile terminal 300 to delete the duplicated MMS arrival notification in step 360. When receiving the duplicated-message deletion message (M-DeleteNoti.ind), the receiving mobile terminal 300 recognizes the fact that it is impossible to access relevant multimedia message any further from the duplicated-message deletion message (M-DeleteNoti.ind) and extracts and deletes only a duplicated MMS arrival notification from among previously-received MMS arrival notifications on the basis of information included in the duplicated-message deletion message (M-DeleteNoti.ind).

A view representing a construction of a duplicated-message deletion message (M-DeleteNoti.ind) according to an embodiment of the present invention is shown in FIG. 4. The construction of the duplicated message deletion message shown in FIG. 4 is only a preferred embodiment of the present invention. Therefore, it is envisioned that fields may be modified added and/or removed to/from the construction according to necessity. For instance, the duplicated-message deletion message may additionally include fields of "Data", "Delivery-Report", "Delivery-Time", "Message-ID", "Priority", "Read-Reply", "Report-Allowed", "Response-status", "Response-Text", "Sender-Visibility" and "Status" fields, and any other fields may be added without limit according to necessity.

The receiving mobile terminal 300 according to the first and second embodiment of the present invention described above receives a duplicated-message deletion message (M-DeleteNoti.ind) from the MMS proxy server 200, searches for duplicated MMS arrival notifications having the same field or the same multiple fields as fields included in the duplicated-message deletion message (M-DeleteNoti.ind), and deletes relevant MMS arrival notifications. Preferred embodiments of such a procedure will now be described.

First, a duplicated MMS arrival notification may be deleted using "X-Mms-Transaction-ID". Since each "X-Mms-Transaction-ID" has a peculiar value, it is possible to extract and delete only a duplicated MMS arrival notification by comparing values of "X-Mms-Transaction-IDs". That is, a 'Delete-Transaction-ID' field of the duplicated-message deletion message (M-DeleteNoti.ind) includes the "X-Mms-Transaction-ID" of a duplicated MMS arrival notification. Therefore, it is possible to delete only a duplicated MMS arrival notification by comparing the "X-Mms-Transaction-ID' included in the "Delete-Transaction-ID" field with the "X-Mms-Transaction-IDs" of previously-received MMS arrival notifications.

Second, a duplicated MMS arrival notification may be deleted using URI information. Since all MMS arrival notifications doubly-transmitted for a single message have equal URI information, it is possible to extract and delete only a duplicated MMS arrival notification with reference to the "X-Mms-Content-Location" field of the duplicated-message deletion message (M-DeleteNoti.ind). That is, when the receiving mobile terminal 300 receives the duplicated-message deletion message (M-DeleteNoti.ind), the receiving mobile terminal 300 may compare the "X-Mms-Content-Location" field of the duplicated-message deletion message (M-DeleteNoti.ind) with the "X-Mms-Content-Location" fields of previously-received MMS arrival notifications, and may extract and delete only the duplicated MMS arrival notification by finding an equal "X-Mms-Content-Location" field.

Meanwhile, it is possible to extract and delete a duplicated MMS arrival notification not only by the above-mentioned methods but also by a method using combination of the "X-Mms-Transaction-ID" and the "X-Mms-Content-Location". That is, all the methods using a single field and using combination of two or more fields of the duplicated-message deletion message (M-DeleteNoti.ind) may be used to extract and delete a duplicated MMS arrival notification.

Meanwhile, the duplicated-message deletion message (M-DeleteNoti.ind) includes an "X-Mms-Delete-Reason" field which contains a message to be transmitted from the MMS proxy server 200 to the receiving mobile terminal 300. The message contained in the "X-Mms-Delete-Reason" field is used to report an execution result to the user. That is, when the receiving mobile terminal 300 receives the duplicated-message deletion message (M-DeleteNoti.ind) for deleting a duplicated MMS arrival notification from among previously-received MMS arrival notifications, it is possible to enable a user to recognize the reason why the relevant message has been deleted in the MMS server by using the "X-Mms-Delete-Reason" field included in the duplicated-message deletion message (M-DeleteNoti.ind).

As described above, according to the method for managing a duplicated MMS arrival notification message of the present invention, since a duplicated MMS arrival notification for the same multimedia message can be deleted in an MMS service environment, it is possible to prevent user errors, thereby preventing waste of bandwidth, and subsequent charge users.

While the present invention has been shown and described with reference to certain preferred embodiments thereof, it will be understood by those skilled in the art that various changes in form and details may be made therein without departing from the spirit and scope of the invention as defined by the appended claims. Accordingly, the scope of the invention is not to be limited by the above embodiments but by the claims and the equivalents thereof.

What is claimed is:

1. A method for managing a duplicated arrival notification message in a multimedia messaging service system which includes an MMS proxy server and a receiving mobile communication terminal, the method comprising:
  receiving by the MMS proxy server a download completion notification message for an MMS message, the download completion notification message being transmitted from the receiving mobile terminal;
  transmitting a duplicated-message deletion message from the MMS proxy server to the receiving mobile terminal when the MMS proxy server receives the download completion notification message; and
  extracting and deleting only a duplicated MMS arrival notification message from among previously-received MMS arrival notification messages with reference to the duplicated-message deletion message by the receiving mobile terminal when the receiving mobile terminal receives the duplicated-message deletion message from the MMS proxy server.

2. A method for managing a duplicated arrival notification message in a multimedia messaging service system which includes an MMS proxy server and a receiving mobile communication terminal, the method comprising:
  transmitting a duplicated deletion message for deleting a doubly-received MMS arrival notification message, wherein the duplicated deletion message includes one of an ID (X-Mms-Transaction-ID) field for representing an MMS arrival notification message to be deleted and an delete reason (X-Mms-Delete-Reason) field containing a deletion reason.

3. The method as claimed in claim 1, further comprising extracting and deleting only a duplicated MMS arrival notification message with reference to at least one of fields included in the received duplicated-message deletion message, when the receiving mobile terminal receives the duplicated-message deletion message from the MMS proxy server.

4. The method as claimed in claim 1, further comprising notifying a user of a reason why a relevant message has been deleted from the MMS proxy server by using a field of the received duplicated-message deletion message, when the receiving mobile terminal receives the duplicated-message deletion message from the MMS proxy server and deletes a relevant duplicated MMS arrival notification message.

5. The method as claimed in claim 2, further comprising extracting and deleting only a duplicated MMS arrival notification message with reference to at least one of fields included in the received duplicated deletion message, when the receiving mobile terminal receives the duplicated deletion message from the MMS proxy server.

6. The method as claimed in claim 2, further comprising notifying a user of a reason why a relevant message has been deleted from the MMS proxy server by using a field of the received duplicated deletion message, when the receiving mobile terminal receives the duplicated deletion message from the MMS proxy server and deletes a relevant duplicated MMS arrival notification message.

* * * * *